United States Patent [19]
Terada et al.

[11] Patent Number: 5,711,562
[45] Date of Patent: Jan. 27, 1998

[54] BUMPER ASSEMBLY FOR VEHICLES

[75] Inventors: Haruhiko Terada, Oobu; Shinichi Haneda, Anjyo; Kenji Ono, Toyota; Kunio Ohashi, Toyota; Koji Saeki, Toyota, all of Japan

[73] Assignees: Aisin Seiki Kabushiki Kaisha; Toyota Jidosha Kabushiki Kaisha, both of Japan

[21] Appl. No.: 699,699

[22] Filed: Aug. 14, 1996

[30] Foreign Application Priority Data

Aug. 24, 1995 [JP] Japan ................... 7-215658

[51] Int. Cl.⁶ ................................. B60R 19/22
[52] U.S. Cl. ................................. 293/120
[58] Field of Search ................ 293/136, 120, 293/121

[56] References Cited

U.S. PATENT DOCUMENTS

| | | | |
|---|---|---|---|
| 3,926,463 | 12/1975 | Landwehr et al. | 293/136 |
| 4,275,912 | 6/1981 | Bayer | 293/120 |
| 4,466,646 | 8/1984 | Delmastro et al. | 293/120 |
| 4,504,534 | 3/1985 | Adachi et al. | 293/120 |

FOREIGN PATENT DOCUMENTS

| | | |
|---|---|---|
| 62-71061 | 5/1987 | Japan . |
| 62-144756 | 9/1987 | Japan . |
| 1-77549 | 5/1989 | Japan . |
| 2-125458 | 10/1990 | Japan . |
| 4-310446 | 11/1992 | Japan . |
| 4-46998 | 11/1992 | Japan . |

*Primary Examiner*—Gary C. Hoge
*Attorney, Agent, or Firm*—Finnegan, Henderson, Farabow, Garrett & Dunner, L.L.P.

[57] ABSTRACT

A bumper assembly is effective to prevent stepped walls of a concave portion of a bumper cover from being sharply deformed. Cavities are formed at parts of an energy absorber facing to a bottom wall of the concave portion of the bumper cover to define spaces behind the bottom wall. The stepped walls are moved in the cavities of the energy absorber when the energy absorber is deformed elastically in collision.

4 Claims, 4 Drawing Sheets

BUMPER ASSEMBLY FOR VEHICLES

BACKGROUND OF THE INVENTION

The present invention relates to a bumper assembly for vehicles and more particularly to a bumper assembly to which a license plate may be attached.

In general, a bumper assembly for vehicles includes a reinforcement to be secured to a vehicle body and made of a light metal alloy, a fiber-reinforced plastic or the like, a shock or energy absorber consisting of urethane form or the like and disposed on the load surface of the reinforcement, and a bumper shell or facia of a synthetic resin for covering the shock absorber. As disclosed in the Japanese Utility Model Laid Open (KOKAI) Publication No. 71061/1987 (Published on May 6, 1987), the shock or energy absorber is provided at its center portion with a recess portion and the bumper shell is provided with a concave portion fitted into the recess portion of the shock absorber and having a bottom wall and stepped walls. A license plate is attached to the bumper shell to close the concave thereof. The bottom and stepped walls of the concave of the bumper shell or cover always contact or have a certain gap with bottom and stepped walls of the recess of the shock or energy absorber across the whole area.

However, the prior art assembly described above has had a problem that while the bumper shell or cover is deformed together with the elastic deformation of the energy absorber by a load such as an impact load in a collision, the energy absorber becomes a barrier wall in a direction of input of the impact load for the protection of the bumper cover because the bottom and stepped walls of the concavity of the bumper cover always contact with the bottom and stepped walls of the recess of the energy absorber across the whole area, thus likely to effect a sharp bend or crack of the stepped wall of the concave when it is deformed. As a result, the appearance of the bumper assembly is degraded when the energy absorber and the bumper cover are restored after absorbing a shock.

Accordingly, it is an object of the present invention to solve the aforementioned problem by preventing such sharp bending deformation of the stepped wall of the concave of the bumper cover.

SUMMARY OF THE INVENTION

In order to solve the aforementioned problem, the following measure has been taken in the present invention. That is, recesses are formed at parts of a bottom surface of an energy absorber facing to a bottom wall of a concave of a bumper cover to define spaces between the bottom wall and the bottom surface which permit stepped walls of the concave to move therein with respect to the energy absorber when the energy absorber is deformed elastically.

According to this measure, while the bumper cover is also deformed together with the energy absorber when the energy absorber is deformed elastically to absorb a shock or an impact load, the stepped walls of the bumper cover will move within the spaces with respect to the energy absorber at this time. Thereby, it becomes possible to prevent the sharp bending deformation or crack of the stepped walls of the concave of the bumper cover.

To achieve the objects and in accordance with the purpose of the invention, as embodied and broadly described herein, the bumper assembly of this invention comprises, a reinforcement adapted to be fixed to a vehicle's body, an energy absorber secured to the reinforcement for absorbing a shock in collision, and a bumper cover for covering the energy absorber and serving as a trim, the energy absorber having a recess which is composed of a bottom surface, side surfaces and cavities, the cavities formed on the bottom surface, the bumper cover having a concave portion for a license plate which is composed of a bottom wall facing to the bottom surface of the recess of the energy absorber and side walls facing to the side surfaces of the recess of the energy absorber to provide spaces defined by the cavities of the energy absorber and the bottom wall of the concave portion, the side walls being deformable into the spaces.

BRIEF DESCRIPTION OF DRAWINGS

These and other features, aspects and advantages of the present invention will be better understood with reference to the following description, appended claims and accompanying drawings, wherein:

DESCRIPTION OF PREFERRED EMBODIMENTS

Figure 1:
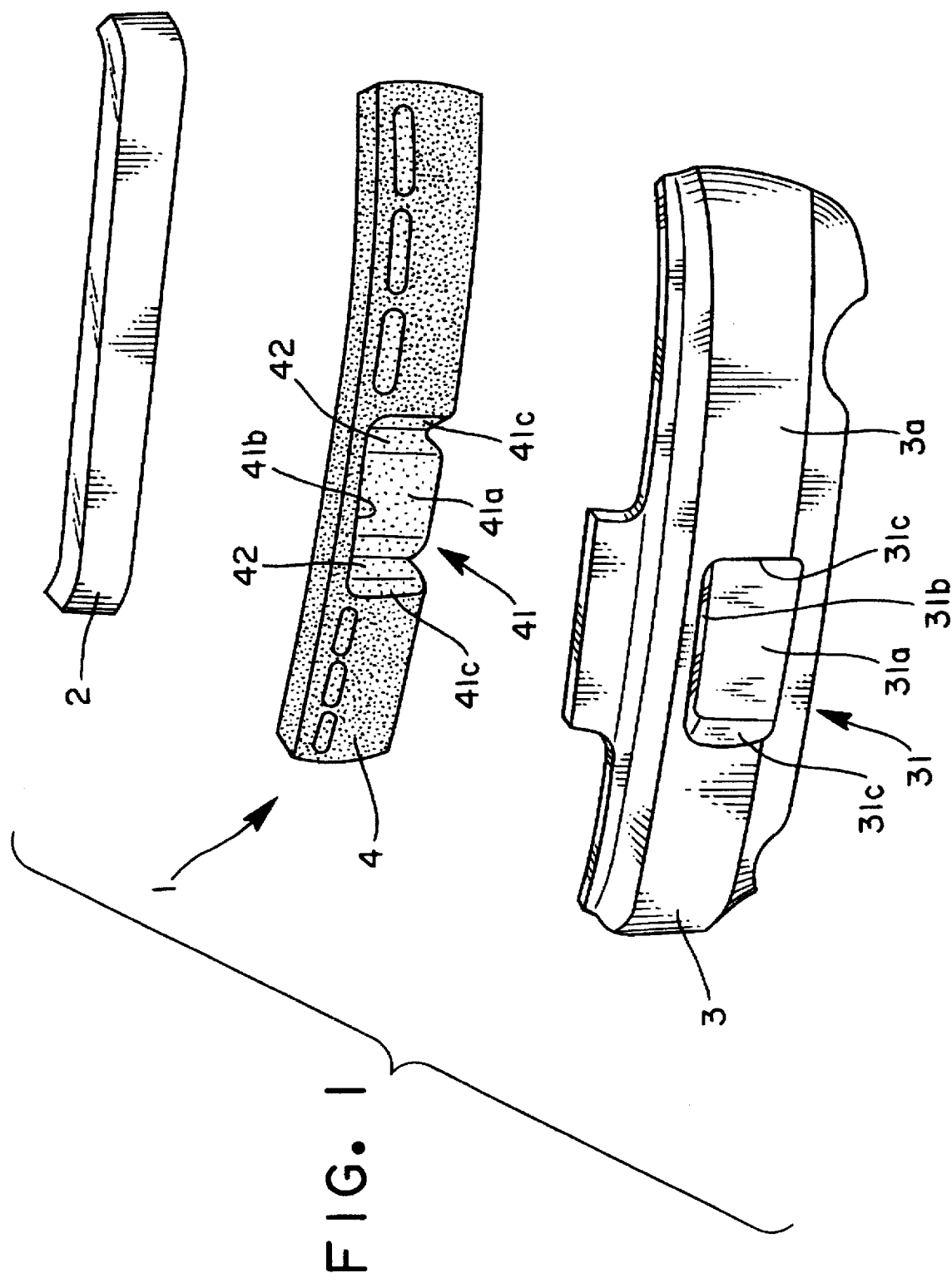
FIG. 1 is a perspective view of a bumper assembly of the present invention.
Figure 2:
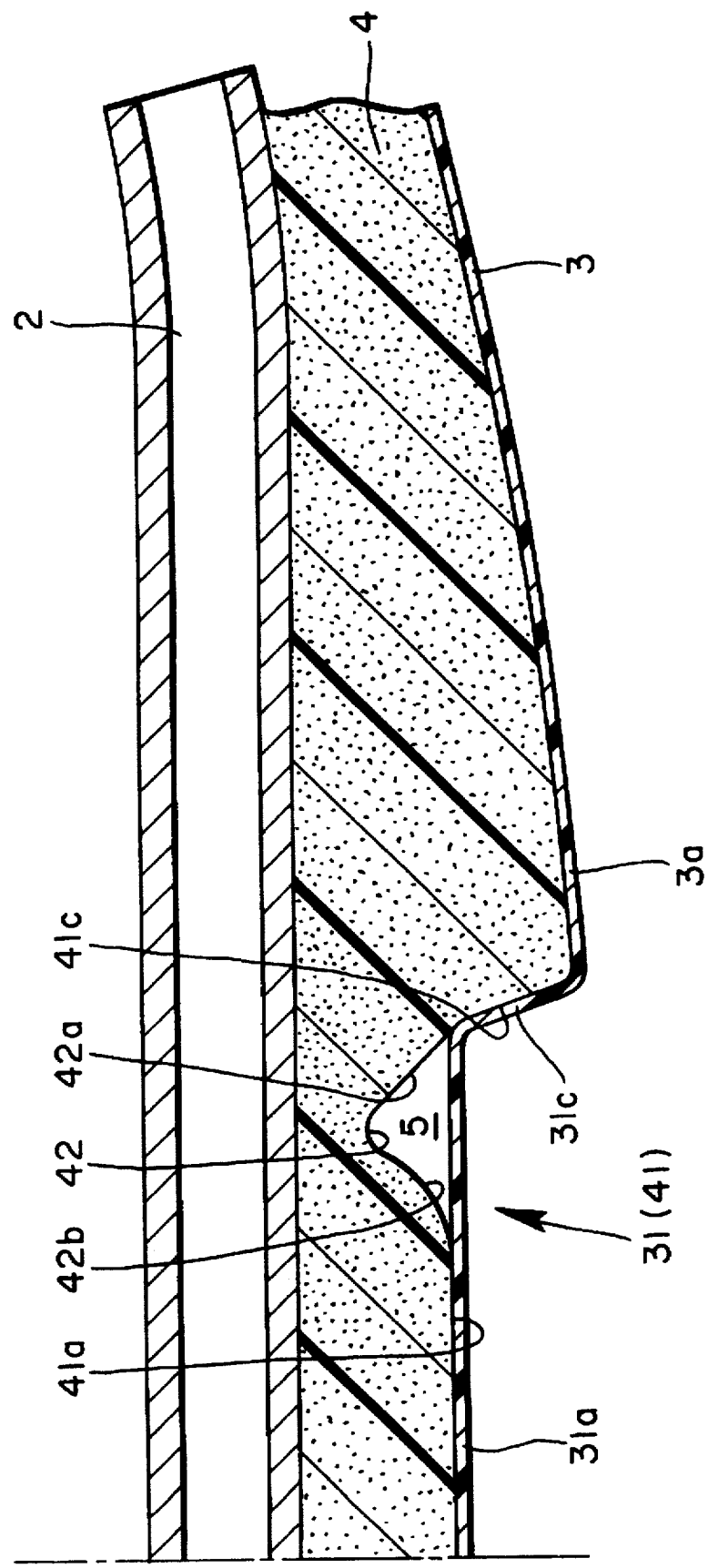
FIG. 2 is a transverse section view of the bumper assembly of the present invention.

A preferred embodiment of the present invention will be explained below with reference to the drawings. As shown in FIGS. 1 and 2, a bumper assembly for vehicles 1 comprises a reinforcement 2, a bumper shell or cover 3 and an energy absorber 4, which are constructed by a conventional manner.

The reinforcement 2 constitutes a rigid body of the bumper assembly and is fixed on side members of the vehicle. The reinforcement 2 has a cross section in the rectangular shape with a hollow section to be deformable plastically to absorb a shock or an impact load in collision. The reinforcement 2 is made of a metallic material such as an aluminum and high-tension material or of a highly rigid resin material. The bumper cover 3 constitutes a trim as the bumper assembly 1. The bumper cover is fixed to the body of the car and is made of a synthetic resin material. The energy absorber 4 is made of a foamed member such as polyurethane foam and polypropylene foam and disposed between the reinforcement 2 and the bumper cover 3, which is deformed elastically to absorb the shock.

A concave portion 31 for attaching a license plate (not shown) is formed on the center part of the bumper cover 3 in a direction of width of the vehicle (horizontal direction in FIGS. 1 and 2). The concave portion 31 is composed of a bottom 31a, an upper portion 31b and a pair of side walls 31c which rise from the bottom 31a and continue to a trim wall 3a of the bumper cover 3. It is noted that the license plate is fixed to the bottom wall 31a of the concave portion 31 via brackets and the like.

Figure 3:
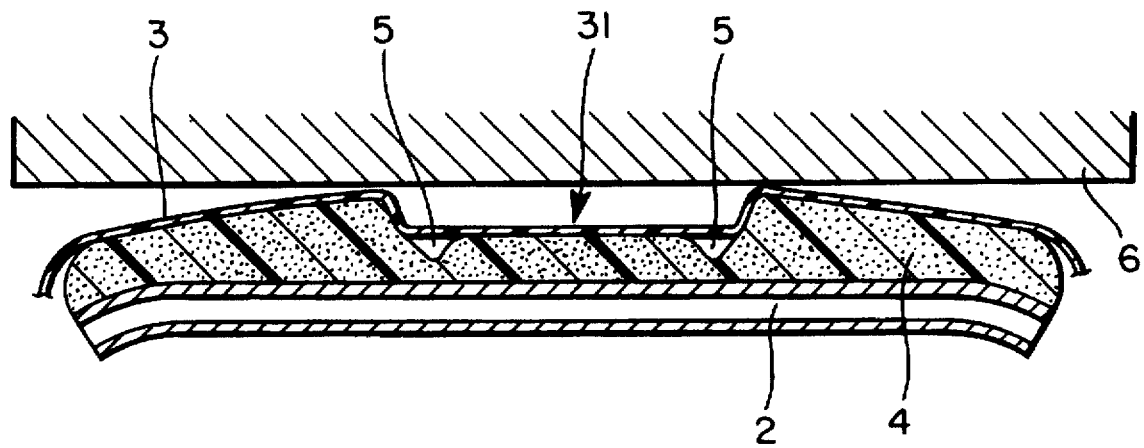
FIG. 3 is a transverse section view of the bumper assembly, showing a state before absorbing a shock.

A recess 41 formed on the energy absorber 4 is also composed of a bottom surface 41a which faces to the bottom 31a of the concave portion 31, an upper surface 41b which faces to the upper portion 31b of the concave portion 31 and a pair of side surface 41c which face to the side walls 31c of the concave portion 31. Further, a pair of cavities 42 are formed on the bottom surface 41a of the recess 41 to extend continuously from the side surfaces 41c along both the side walls 31c of the concave portion 31. The cavities 42 define spaces 5 behind the bottom 31a of the concave portion 31 when the energy absorber 4 is not deformed, as shown in FIG. 3. Each cavity 42 has a cross section similar to a triangle and has a surface 42a which is an oblique line continuing from the side surface 41c and a surface 42b which is an oblique line facing to the surface 42a.

It is noted that the side surfaces 41c of the recess 41 of the energy absorber 4 always contact with the side walls 31c of the concave portion 31 and part of the bottom surface 41a of the recess 41 contacts with the bottom 31a of the concave portion 31. Between the side surface 41c and side wall 31c and/or the bottom surfaces 41a and the bottom wall 31a small gap may be provided.

An operation of the bumper assembly described above will be explained below.

Figure 4:
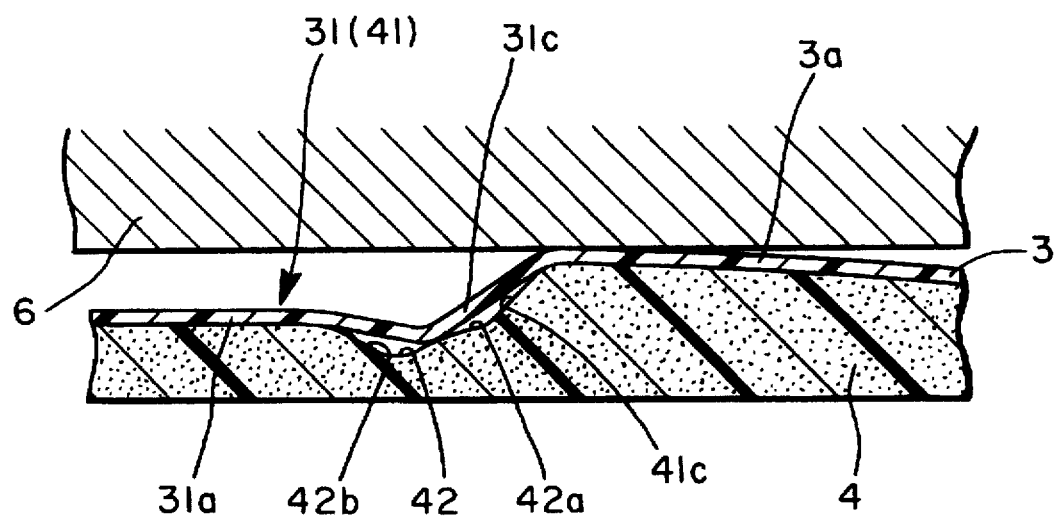
FIG. 4 is an enlarged section view of a main part of the bumper assembly, showing a state when the shock is absorbed.

FIG. 3 shows the bumper assembly 1 in a normal state. When the vehicle collides with an obstacle or barrier 6 shown in FIG. 3 and its shock or impact load is applied to the bumper assembly 1, the shock is absorbed by the elastic deformation of the energy absorber 4 and the plastic deformation of the reinforcement 2. At this time, although the bumper cover 3 is also deformed together with the energy absorber 4, the side walls 31c of the concave portion 31 are forced into the spaces 5 along the surfaces 42a of the cavities 42 because the parts of the bottom 31a of the concave portion 31 facing to the cavities 42 are bent flexibly such that they contact with the surfaces 42b of the cavities 42 as shown in FIG. 4. Because the bottom 31a of the concave portion 31 moves thus into the spaces 5, the bottom wall 31a is not sharply bent when it is deformed.

It is noted that although the cavities 42 are provided along the side walls 31c of the concave portion 31, it may be provided additionally along the upper wall 31b of the concave portion 31.

Figure 5:
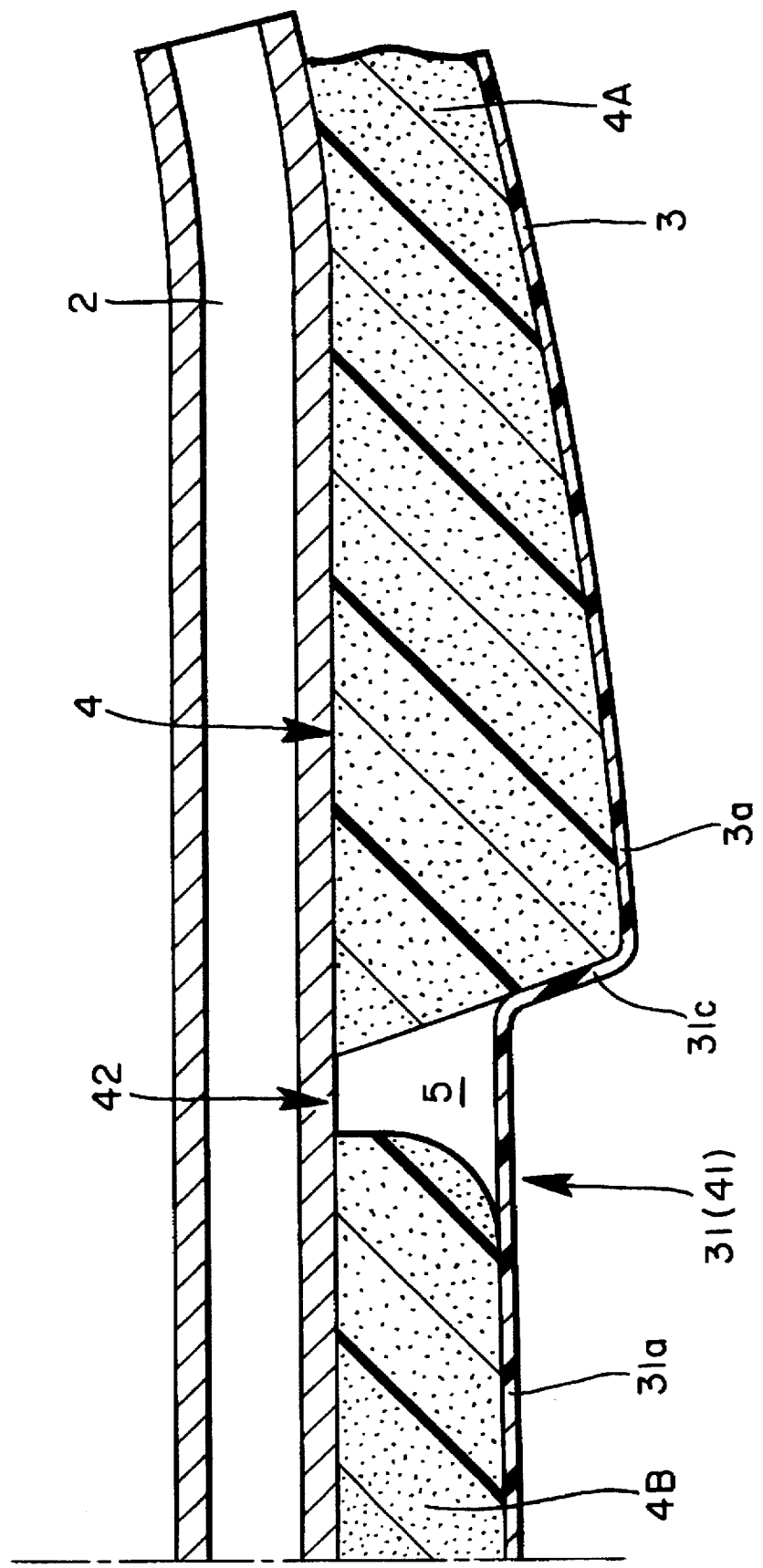
FIG. 5 is a section view corresponding to FIG. 2, showing a variation of the bumper assembly.

It is also possible as shown in FIG. 5 to form the cavities 42 by dividing the energy absorber 4 into a center member 4B and side members 4A and by setting the spaces 5 in part facing to the side walls 31c between the center member 4B and the side members 4A.

As many apparently widely different embodiments of the present invention can be made without departing from the spirit and scope thereof, it is to be understood that the invention is not limited to the specific embodiments thereof except as defined in the appended claims.

What is claimed is:

1. A bumper assembly for a vehicle comprising:
    a reinforcement adapted to be fixed to a vehicle's body;
    an energy absorber secured to the reinforcement for absorbing a shock in collision; and
    a bumper cover for covering the energy absorber and serving as a trim;
    the energy absorber having a recess which is composed of a bottom surface, side surfaces and cavities, the cavities formed on the bottom surface;
    the bumper cover having a concave portion for a license plate which is composed of a bottom wall facing to the bottom surface of the recess of the energy absorber and side walls facing to the side surfaces of the recess of the energy absorber to provide spaces defined by the cavities of the energy absorber and the bottom wall of the concave portion, said side walls being deformable into the spaces.

2. A bumper assembly according to claim 1, wherein the side walls of the bumper cover is forced in the spaces by elastic deformation thereof when the shock is applied to the bumper assembly.

3. A bumper assembly according to claim 2, wherein the side walls of the cavities are continuous to the side surfaces of the recess of the energy absorber.

4. A bumper assembly for a vehicle comprising:
    a reinforcement adapted to be fixed to a vehicle's body;
    an energy absorber secured to the reinforcement for absorbing a shock in collision; and
    a bumper cover for covering the energy absorber and serving as a trim;
    the energy absorber comprising two side members and a center member between the side members, and having a recess which is composed of a bottom surface, side surfaces and cavities, the cavities formed between each side member and the center member;
    the bumper cover having a concave portion which is composed of a bottom wall facing to the bottom surface of the energy absorber and side surfaces facing to the side surfaces of the energy absorber to provide spaces defined by the cavities of the energy absorber and the bottom wall of the bumper cover;
    the side surfaces of the concave portion of the bumper cover being forced into the spaces by elastic deformation thereof when the shock of the collision is applied to the bumper assembly.

\* \* \* \* \*